(12) United States Patent
Mikami

(10) Patent No.: US 8,345,327 B2
(45) Date of Patent: Jan. 1, 2013

(54) IMAGE READING APPARATUS

(75) Inventor: Ryo Mikami, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 299 days.

(21) Appl. No.: 12/895,715

(22) Filed: Sep. 30, 2010

(65) Prior Publication Data

US 2011/0096375 A1 Apr. 28, 2011

(30) Foreign Application Priority Data

Oct. 28, 2009 (JP) ................................. 2009-247634

(51) Int. Cl.
*H04N 1/04* (2006.01)
(52) U.S. Cl. ........ 358/475; 358/520; 358/509; 358/505; 382/275; 382/274
(58) Field of Classification Search .................. 358/475, 358/520, 516, 474, 509, 501, 505, 513, 514, 358/1.16, 461, 523, 512; 382/274, 275, 234
See application file for complete search history.

(56) References Cited

U.S. PATENT DOCUMENTS

| | | | |
|---|---|---|---|
| 5,987,186 A * | 11/1999 | Oida et al. | 382/274 |
| 7,158,271 B2 * | 1/2007 | Sawada | 358/505 |
| 7,224,483 B2 * | 5/2007 | Hanabusa et al. | 358/1.6 |
| 7,292,378 B2 * | 11/2007 | Chiba et al. | 358/473 |
| 7,471,426 B2 * | 12/2008 | Ide et al. | 358/474 |
| 7,511,862 B2 * | 3/2009 | Sano et al. | 358/474 |
| 7,515,298 B2 * | 4/2009 | Suzuki et al. | 358/1.9 |
| 7,557,969 B2 * | 7/2009 | Sone | 358/504 |
| 7,626,735 B2 * | 12/2009 | Mizuhashi et al. | 358/474 |
| 7,990,582 B2 * | 8/2011 | Ide et al. | 358/474 |
| 2010/0302602 A1 | 12/2010 | Mikami | 358/406 |

FOREIGN PATENT DOCUMENTS

| | | |
|---|---|---|
| JP | 2001-144988 | 5/2001 |
| JP | 2001-148003 | 5/2001 |

OTHER PUBLICATIONS

U.S. Appl. No. 12/855,480, filed Aug. 12, 2010 by Ryo Mikami, entitled "Image Reading Apparatus".

* cited by examiner

*Primary Examiner* — Negussie Worku
(74) *Attorney, Agent, or Firm* — Fitzpatrick, Cella, Harper & Scinto

(57) ABSTRACT

An image reading apparatus, which reads an image on an original, including: a light source extending along a main scanning direction to illuminate the original; a plurality of line sensors configured to receive light reflected from the original and to output light intensity signals; a storage unit configured to store reference data; and a determination unit configured to obtain determination data regarding hue based on a light intensity signal output from one of the plurality of line sensors that receive light reflected from a reflective reference member illuminated by the light source and a light intensity signal output from another of the plurality of line sensors that receive light reflected from the reflective reference member illuminated by the light source and to determine a hue balance of the light source based on the determination data and the reference data stored in the storage unit.

20 Claims, 6 Drawing Sheets

FIG. 3
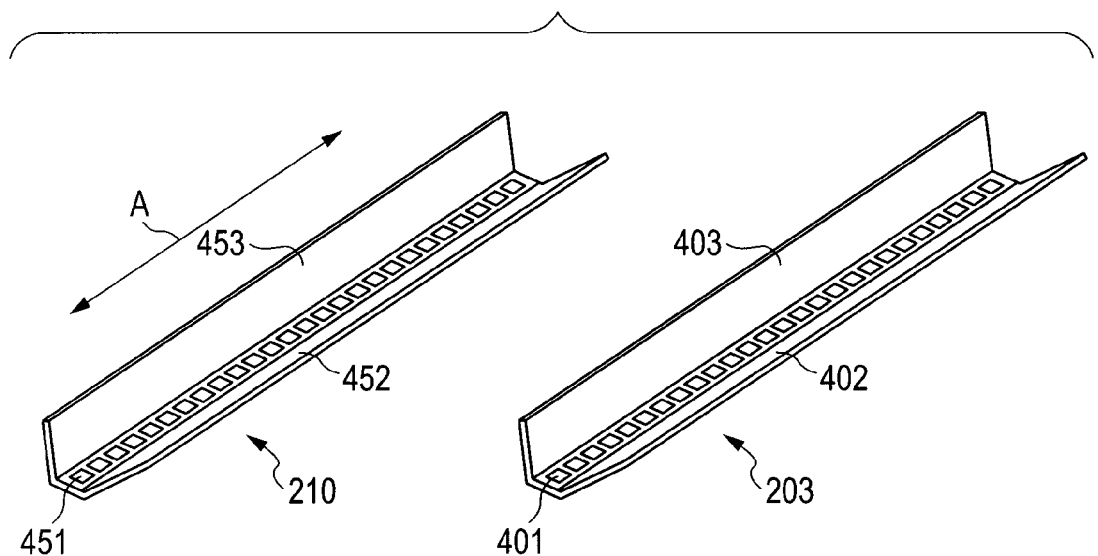
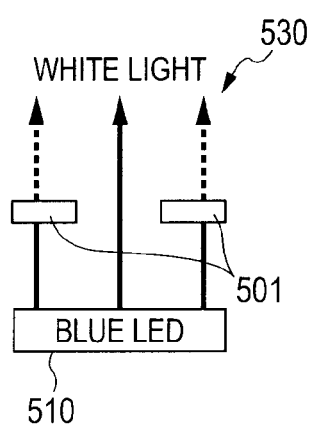
FIG. 4A
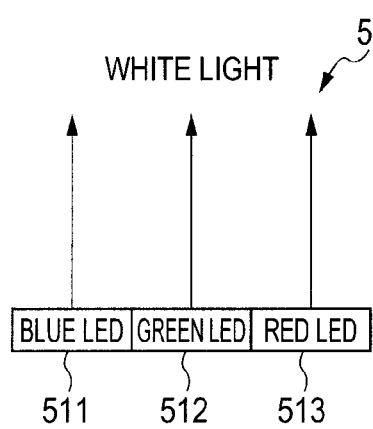
FIG. 4B
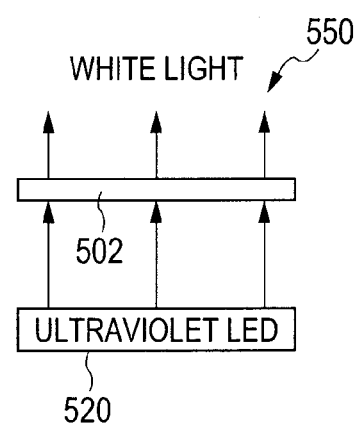
FIG. 4C

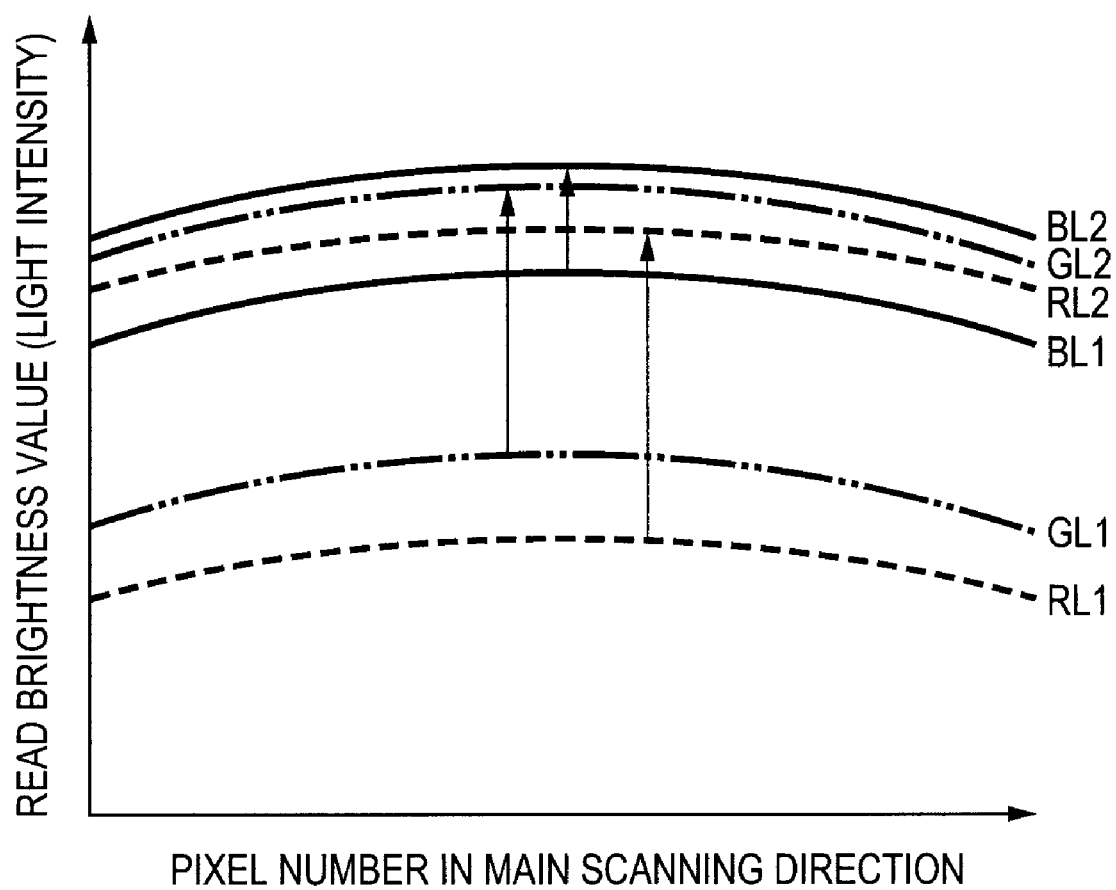

IMAGE READING APPARATUS

BACKGROUND OF THE INVENTION

1. Field of the Invention

The present invention relates to an image reading apparatus in which a hue balance of a light source is determined.

2. Description of the Related Art

General image reading apparatus include an original illuminating light source (hereinafter referred to as a light source) configured to illuminate an original so as to read an image on the original. The light source extends along a main scanning direction, and illuminates a reading target portion (line) of the original in a linear manner. Conventionally, a rare gas phosphor lamp typified by a white xenon lamp has been used as the light source. Nowadays, an LED array having a plurality of light emitting diodes (LEDs) arrayed in line at regular intervals is used as the light source in order to achieve higher power efficiency and downsizing of the light source. The LED array is disposed so as to keep a distance from the surface of the reading target original within a predetermined range.

In recent years, there has been an increasing need for higher color reproducibility of the image reading apparatus. Matters regarding image quality are mostly attributed to the light source. Further, abnormality or deterioration of the light source may largely influence the original reading performance. Therefore, many technologies have been developed to solve the problem of the abnormality and deterioration of the light source. Japanese Patent Application Laid-Open No. 2001-148003 discloses a technology of determining whether or not there is any abnormality in lighting-up characteristics of an external electrode xenon lamp. In Japanese Patent Application Laid-Open No. 2001-148003, a light intensity signal output from a CCD line sensor during a period from the start of lighting-up to the reading of a predetermined line is held in a line memory as image data of a plurality of lines in the main scanning direction, and the held image data and reference data are compared with each other. Based on the comparison result, it is determined whether or not there is any abnormality due to removal of part of a tape electrode of the xenon lamp.

Meanwhile, when an accumulated lighting-up time of the xenon lamp exceeds 500 hours, the xenon lamp has a stable light intensity level and RGB output balance. However, in the early stage immediately after the xenon lamp is replaced, the light intensity level output from the CCD line sensor may largely decline and the RGB output balance may largely change. In view of this, Japanese Patent Application Laid-Open No. 2001-144988 discloses a technology of preventing deterioration in color reproducibility due to the change in characteristics of the xenon lamp resulting from the replacement of the xenon lamp. In Japanese Patent Application Laid-Open No. 2001-144988, initial light intensity levels of RGB line sensors of the xenon lamp are detected, and based on the change in light intensity levels, it is determined whether or not the lamp has been replaced. When the lamp has been replaced, a color correction coefficient is initialized. After the initialization, the color correction coefficient is selected from a read only memory (RAM), to prevent a hue imbalance in the early stage after the replacement.

Incidentally, there is a kind of LED that is combined with a phosphor to emit white light. An LED generates a large amount of heat, and, though there is a difference depending on whether or not a heat dissipation measure is taken, deterioration of the phosphor is accordingly likely to occur. The deterioration of the phosphor may result in a color imbalance among red (R), green (G), and blue (B) of the white LED. When the RGB output balance is lost to a large extent, even if the image data is corrected in image processing, the quality of the reproduced image may decline.

In the light source, chromaticity changes because of deterioration over time. The use of the light source deteriorated over time may lead to a problem of a hue imbalance of the read image. In the technology of detecting abnormality of the light source by comparing the light intensity of the light source with the reference data, and in the technology of determining whether or not the lamp has been replaced based on the change in light intensity levels of the RGB line sensors, there is a problem that the hue balance of the light source cannot be determined.

SUMMARY OF THE INVENTION

The present invention provides an image reading apparatus in which a hue balance of a light source is determined.

The present invention provides an image reading apparatus, which reads an image on an original, the image reading apparatus including: a light source extending along a main scanning direction to illuminate the original; a plurality of line sensors configured to receive light reflected from the original and to output light intensity signals; a storage unit configured to store reference data; and a determination unit configured to obtain determination data regarding hue based on a light intensity signal output from one of the plurality of line sensors that receive light reflected from a reflective reference member illuminated by the light source and a light intensity signal output from another of the plurality of line sensors that receive light reflected from the reflective reference member illuminated by the light source and to determine a hue balance of the light source based on the determination data and the reference data stored in the storage unit.

According to the present invention, the hue balance of the light source of the image reading apparatus can be determined.

Further features of the present invention will become apparent from the following description of exemplary embodiments with reference to the attached drawings.

BRIEF DESCRIPTION OF THE DRAWINGS

FIG. 3 is an external view of light sources each using a white LED array.

FIGS. 4A, 4B, and 4C are explanatory diagrams illustrating basic principles of white LEDs.

FIG. 7 is a schematic graph illustrating RGB read brightness values of a white plate.

DESCRIPTION OF THE EMBODIMENTS

Embodiment

Hereinbelow, an exemplary embodiment of the present invention will be described.

(Automatic Document Feeder)

Figure 1:
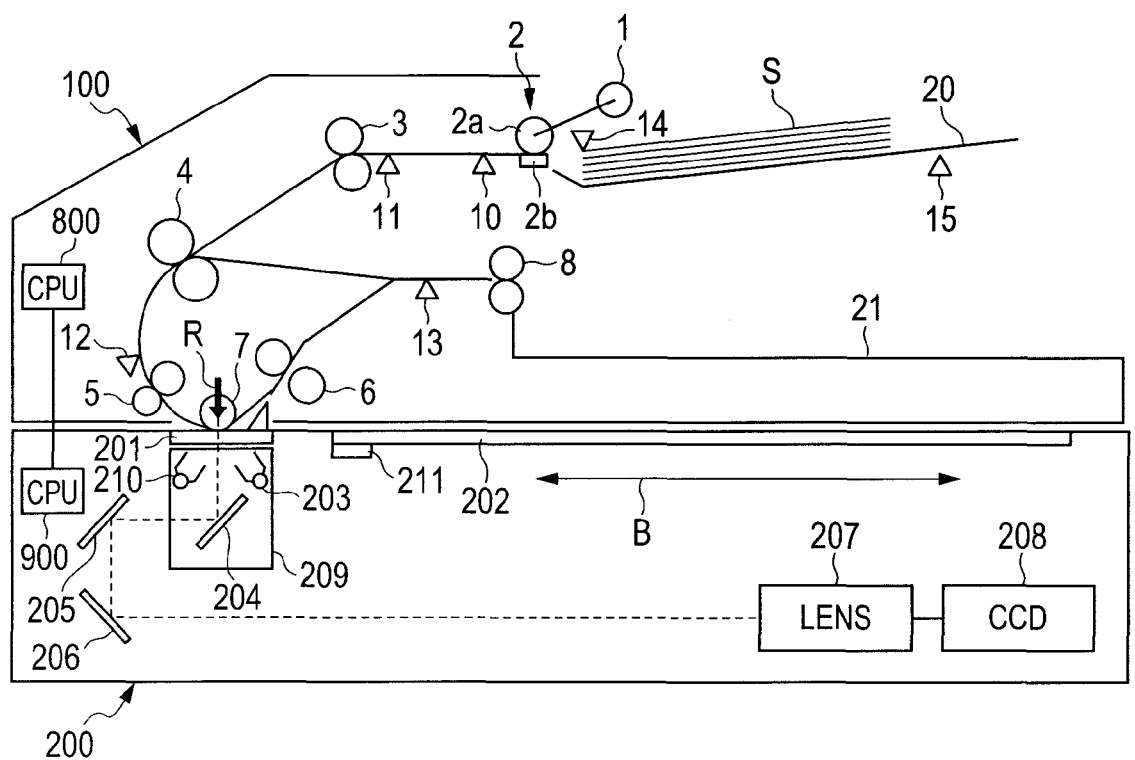
FIG. 1 is a cross-sectional view of an image reading apparatus according to the present invention.

FIG. 1 is a cross-sectional view of an image reading apparatus according to the present invention. In FIG. 1, an automatic document feeder (ADF) 100 is disposed on an image reading apparatus (hereinafter referred to as a reader portion) 200. The ADF 100 includes an original tray 20 on which originals are stacked. A pickup roller 1 feeds, to a separation portion 2, a topmost original of an original stack S loaded on the original tray 20 with its front surface facing upward. The separation portion 2 includes a separation roller 2a disposed in an upper part thereof and a separation pad 2b disposed in a lower part thereof. The separation portion 2 separates one original from the others, to prevent multifeed of the originals. The ADF 100 includes a central processing unit (hereinafter referred to as a CPU) 800 as a control unit configured to control an original transporting operation.

An operation performed in a case of reading an image on a front surface of a one-sided original will be described below. The original separated by the separation portion 2 is subjected to correction of skew feed of the original by first registration rollers 3. The original is transported to a reading position R by the first registration rollers 3, second registration rollers 4, and first transport rollers 5. While the original is being transported through the reading position R, the reader portion 200 reads the image on the front surface of the original. Then, the original is sequentially discharged onto a sheet discharge tray 21 of the ADF 100 by second transport rollers 6 and sheet discharge rollers 8 with the front surface of the original facing downward.

An operation performed in a case of reading images on front and back surfaces of a two-sided original will be described below. The original separated by the separation portion 2 is subjected to the correction of skew feed of the original by the first registration rollers 3. The original is transported to the reading position R by the first registration rollers 3, the second registration rollers 4, and the first transport rollers 5. While the original is being transported through the reading position R, the reader portion 200 reads the image on the front surface of the original. Then, the leading end portion of the original is temporarily transported onto the sheet discharge tray 21 by the second transport rollers 6 and the sheet discharge rollers 8, and the transport of the original is stopped with the trailing end portion of the original nipped between the sheet discharge rollers 8. After that, the sheet discharge rollers 8 are reversed for switchback transport of the original to the second registration rollers 4. The second registration rollers 4 correct skew feed of the original. The original is transported to the reading position R by the second registration rollers 4 and the first transport rollers 5. While the original is being transported through the reading position R, the reader portion 200 reads the image on the back surface of the original. Then, the original is transported onto the sheet discharge tray 21 by the second transport rollers 6 and the sheet discharge rollers 8.

However, if the original is discharged straight onto the sheet discharge tray 21 with its front surface facing upward, the page order of the original stack to be loaded on the sheet discharge tray 21 is different from the page order of the original stack S loaded on the original tray 20. Therefore, after the back surface of the original is read, the leading end portion of the original is temporarily transported onto the sheet discharge tray 21 by the second transport rollers 6 and the sheet discharge rollers 8, and the transport of the original is stopped with the trailing end portion of the original nipped between the sheet discharge rollers 8. After that, the sheet discharge rollers 8 are reversed for the switchback transport of the original to the second registration rollers 4. The original is transported by the second registration rollers 4, the first transport rollers 5, and the second transport rollers 6, and is sequentially discharged onto the sheet discharge tray 21 by the sheet discharge rollers 8 with the front surface of the original facing downward. Note that, the reader portion 200 does not read the image on the original even while the original is being transported through the reading position R.

(Reader Portion)

The reader portion 200 reads the image on the original in an optical manner and performs photo-electric conversion on image information into image data, which is saved in a storage unit or output to an image forming apparatus. The reader portion 200 includes an ADF original platen glass (hereinafter referred to as an ADF platen) 201, a book original platen glass (hereinafter referred to as a book platen) 202, a scanner unit 209, mirrors 205 and 206, a lens 207, and a CCD line sensor (hereinafter referred to as a CCD) 208 as a solid-state image pickup element (an image sensor). The scanner unit 209 integrally includes original illuminating light sources (hereinafter referred to as light sources) 203 and 210, and a mirror 204. The scanner unit 209 is movable between the ADF platen 201 and the book platen 202. The light sources 203 and 210 extend in a main scanning direction for reading the original. A white plate 211 serving as a reflective reference member is provided on an end portion of the book platen 202. The white plate 211 extends in the main scanning direction. Note that, the reflective reference member (a white reference) is not limited to the white plate, and may be a white reference original.

The reader portion 200 further includes a central processing unit (hereinafter referred to as a CPU) 900 as a control unit configured to control an image reading operation. When the reader portion 200 reads the image on the original transported from the ADF 100, the CPU 900 controls an optical system moving unit 302 (FIG. 2B) to move the scanner unit 209 below the ADF platen 201 and then stop the scanner unit 209. While the original is being transported through the reading position R, the reader portion 200 reads the image information of the original. When the reader portion 200 reads the image on the original placed on the book platen 202, the CPU 900 controls the optical system moving unit 302 to move the scanner unit 209 from an original setting reference (not shown) in a sub-scanning direction indicated by the arrow B of FIG. 1. While the scanner unit 209 is moving in the sub-scanning direction B, the reader portion reads the image information of the original. The sub-scanning direction B herein refers to a direction orthogonal to the main scanning direction. The main scanning direction refers to a direction perpendicular to the drawing sheet of FIG. 1.

The image information is read by turning on the light sources 203 and 210 to irradiate the original with light. The light reflected from the original is received by the CCD 208 via the mirrors 204, 205, and 206 and the lens 207. The CCD 208 is constituted by three photodiode arrays (line sensors) having RGB color filters provided thereto. Specifically, the CCD 208 is constituted by a line sensor (an R line sensor) provided with a red color filter, a line sensor (a G line sensor) provided with a green color filter, and a line sensor (a B line sensor) provided with a blue color filter. The CCD 208 performs the photo-electric conversion on the light reflected from the original into analog signals (light intensity signals) as color separation signals of RGB, and outputs the analog signals to an image processing unit 304 (FIG. 2B). In the image processing unit 304, an A/D converter converts the analog signals (light intensity signals) into digital signals (light intensity data). If necessary, an amplifier is used for amplifying the analog signals.

Note that, the present invention is also applicable to an image reading apparatus integrally including the reader portion 200 and the ADF 100.

(Control Portion of ADF)

Figure 2A:
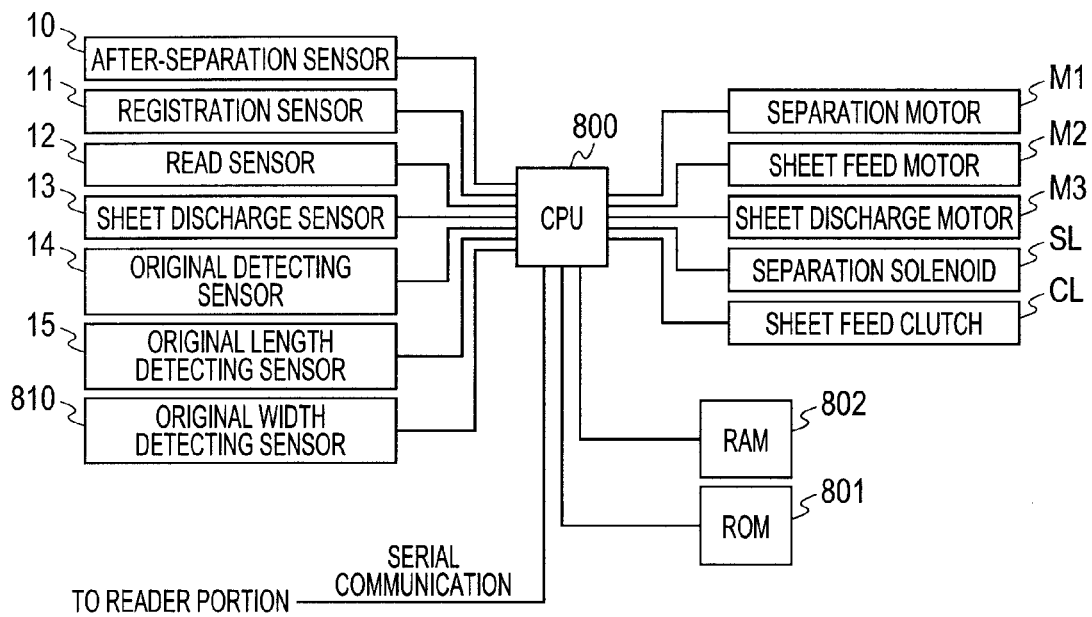
FIG. 2A is a control block diagram of an automatic document feeder (ADF).
Figure 2B:
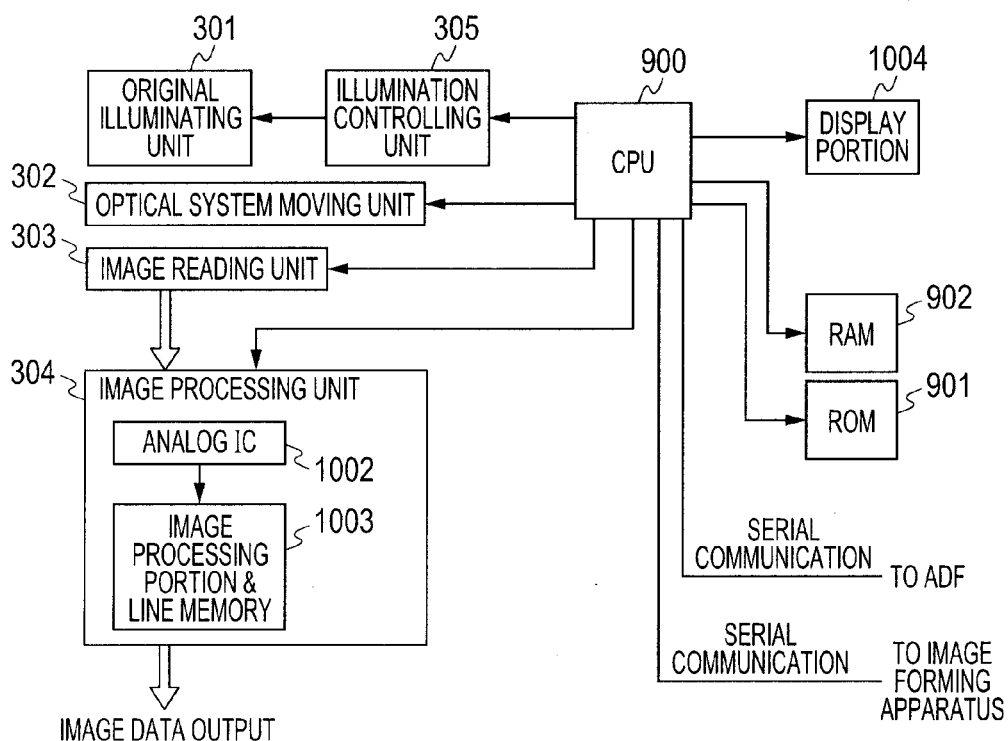
FIG. 2B is a control block diagram of a reader portion according to the present invention.

FIG. 2A is a control block diagram of a drive system of the ADF 100. The CPU 800 is provided with a read only memory (hereinafter referred to as a ROM) 801 and a random access memory (hereinafter referred to as a RAM) 802, and has output ports and input ports. The ROM 801 stores a control program. The RAM 802 stores input data and work data. A separation motor M1, a sheet feed motor M2, a sheet discharge motor M3, a separation solenoid SL, and a sheet feed clutch CL are connected to the output ports. An after-separation sensor 10, a registration sensor 11, a read sensor 12, a sheet discharge sensor 13, an original detecting sensor 14, an original length detecting sensor 15, and an original width detecting sensor 810 are connected to the input ports. The CPU 800 controls the separation motor M1, the sheet feed motor M2, the sheet discharge motor M3, the separation solenoid SL, and the sheet feed clutch CL according to the control program stored in the ROM 801.

(Control Portion of Reader Portion)

FIG. 2B is a control block diagram of the reader portion 200. The reader portion 200 includes an original illuminating unit 301, the optical system moving unit 302, an image reading unit 303, the image processing unit 304, an illumination controlling unit 305, the CPU 900, a ROM (storage unit) 901, and a RAM (storage unit) 902. The original illuminating unit 301 includes the light sources 203 and 210. The optical system moving unit 302 moves the scanner unit 209. The image reading unit 303 includes the CCD 208. The image processing unit 304 performs correction and A/D conversion of the analog signal from the image reading unit 303. The illumination controlling unit 305 performs on/off control for the light sources 203 and 210 of the original illuminating unit 301. The CPU 900 controls the respective components optimally. The image processing unit 304 includes an analog integrated circuit (IC) 1002, which supplies a gain necessary for the analog signal from the CCD 208 of the image reading unit 303. When the gain does not need to be supplied, the CPU 900 sets a gain setting value of the analog IC 1002 to a fixed value "1". The analog IC 1002 performs AD conversion on the analog signal into digital data. The digital data is held in line memories of an image processing portion (application-specific integrated circuit)/line memory 1003. The CPU 900 is connected to a display portion 1004. The display portion 1004 is provided on the reader portion 200. The display portion 1004 displays statuses of the light sources 203 and 210 based on a result of determining a hue balance of the light sources, which will be described later. Note that, when the reader portion 200 is connected to an image forming apparatus, the display portion 1004 may be provided on the image forming apparatus. Further, when the reader portion 200 is connected to an external computer, the display portion 1004 may be displayed on a display of the external computer. In this embodiment, the illumination controlling unit 305 is used, but may be omitted. The on/off control for the light sources 203 and 210 of the original illuminating unit 301 may be performed directly by the CPU 900 instead of by the illumination controlling unit 305. The CPU 900 of the reader portion 200 performs serial communication with the CPU 800 of the ADF 100, to exchange control data between the CPU 900 of the reader portion 200 and the CPU 800 of the ADF 100. Note that, the present invention is not limited to this embodiment. When the present invention is applied to the image reading apparatus integrally including the reader portion 200 and the ADF 100, the ADF and the reader portion may be controlled by a single CPU provided in the integrated image reading apparatus instead of performing communication between the two CPUs. Further, when the reader portion 200 is connected to the image forming apparatus, the CPU 900 of the reader portion 200 may perform serial communication with a CPU of the image forming apparatus, to exchange data between the CPU 900 of the reader portion 200 and the CPU of the image forming apparatus.

(Light Source)

FIG. 3 is an external view of the light sources (illumination units) 203 and 210 using an LED array. The light sources 203 and 210 extend in the main scanning direction indicated by the arrow A of FIG. 3, and are disposed in parallel to each other at a predetermined interval. A plurality of light emitting diodes 401 (hereinafter referred to as LEDs) and a plurality of LEDs 451 are each disposed in line at regular intervals. Light emitted from the plurality of LEDs 401 and 451 that are each disposed in line are reflected and diffused by reflection plates 402 and 403 and reflection plates 452 and 453, respectively, to irradiate the surface of the original. In FIG. 3, each of the LEDs 401 and 451 is formed of an LED chip.

When the LED light source is used for an image reading apparatus capable of reading a color original, it is desired that a white LED be used as each of the LEDs 401 and 451. Note that, the present invention is not limited to the embodiment using the LED. A rare gas phosphor lamp such as a xenon lamp may be used as the light source (the illumination unit).

(White LED)

FIGS. 4A, 4B, and 4C are explanatory diagrams illustrating basic principles of the white LED. It is difficult to manufacture an LED that emits white light directly. Therefore, as illustrated in FIG. 4A, there is provided a white light emission method using a white LED 530 obtained by combining a blue LED 510 and yellow phosphors 501 that emit yellow light when exposed with blue light. Further, as illustrated in FIG. 4B, there is provided a white light emission method using a white LED 540 that employs a blue LED 511, a green LED 512, and a red LED 513. Still further, as illustrated in FIG. 4C, there is provided a white light emission method using a white LED 550 obtained by combining an ultraviolet LED 520 that emits ultraviolet light, and a phosphor 502 that emits light of three colors of red, green, and blue when exposed with the ultraviolet light. The methods illustrated in FIGS. 4A, 4B, and 4C are mainly adopted now because of their simple structures and high efficiency.

Figure 5A:
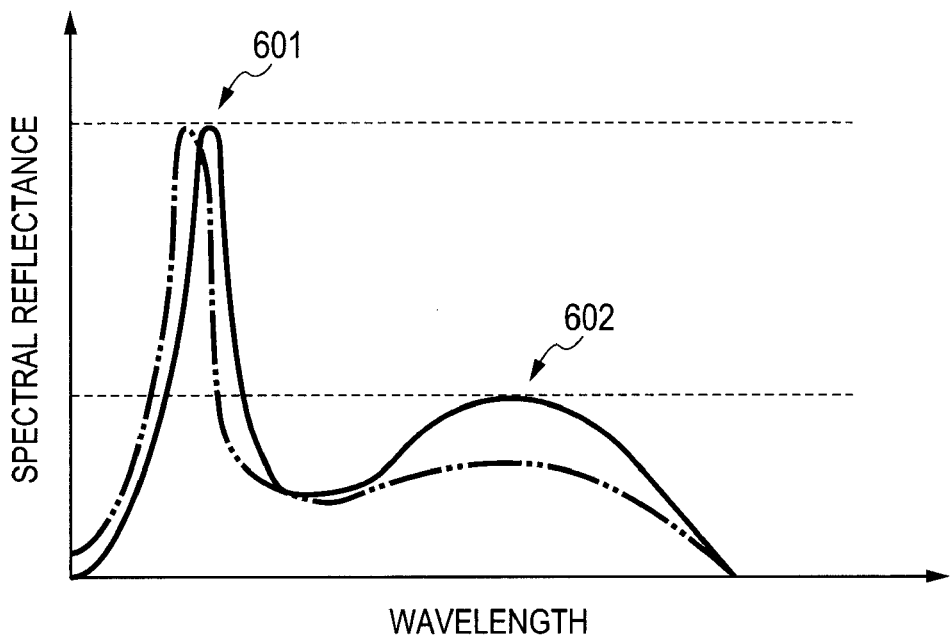
FIGS. 5A and 5B are explanatory graphs illustrating a change in hue balance of the white LED due to deterioration over time.

The deterioration of the white LED occurs mainly because of deterioration of the phosphor. FIG. 5A is a graph illustrating a tendency to a change in spectral reflectance due to deterioration over time of the white LED 530 of FIG. 4A. Such a fact is known that the white LED 530 obtained by combining the blue LED 510 and the yellow phosphors 501 has a spectrum indicated by the solid line of FIG. 5A. The spectral reflectance has a blue color (a first peak) 601 of the blue LED 510 and a yellow color (a second peak) 602 obtained by superimposing red and green components on each other, the red and green components being left by the yellow phosphors 501 absorbing the blue color. When an influence from the deterioration of the yellow phosphors 501 is dominant to that from the semiconductor deterioration of the blue LED 510, the peak point of the portion having a relatively large wavelength (the second peak 602) drops as indicated by the broken line of FIG. 5A. This is because the deterioration of the yellow phosphors 501 weakens the degree of absorbing the blue color. The blue hue accordingly becomes conspicuous as a whole, and hence the position of the first peak 601 is shifted slightly.

Figure 5B:
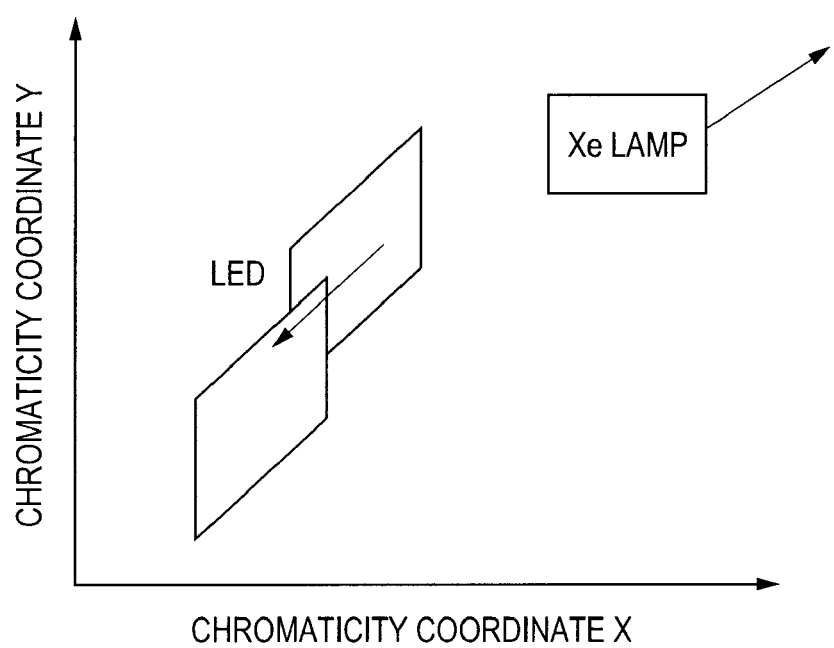

FIG. 5B is an explanatory graph illustrating a tendency to a change in chromaticity due to the deterioration over time of the white LED 530. As illustrated in FIG. 5A, when the yellow phosphors 501 are deteriorated over time, the white LED 530 becomes more bluish, and hence the chromaticity is shifted toward the origin of the graph. In contrast, in the conventional rare gas phosphor lamp, the tendency to the change in chromaticity due to the deterioration over time is different from that of the white LED 530. For example, when the xenon lamp is deteriorated over time, the xenon lamp becomes more yellowish, and hence the chromaticity is shifted away from the origin of the graph. From the fact described above, there are provided detection methods (determination methods of a hue balance) different depending on the type of the light source, which are based on the respective characteristics.

(Determination Method of Hue Balance)

Figure 6:
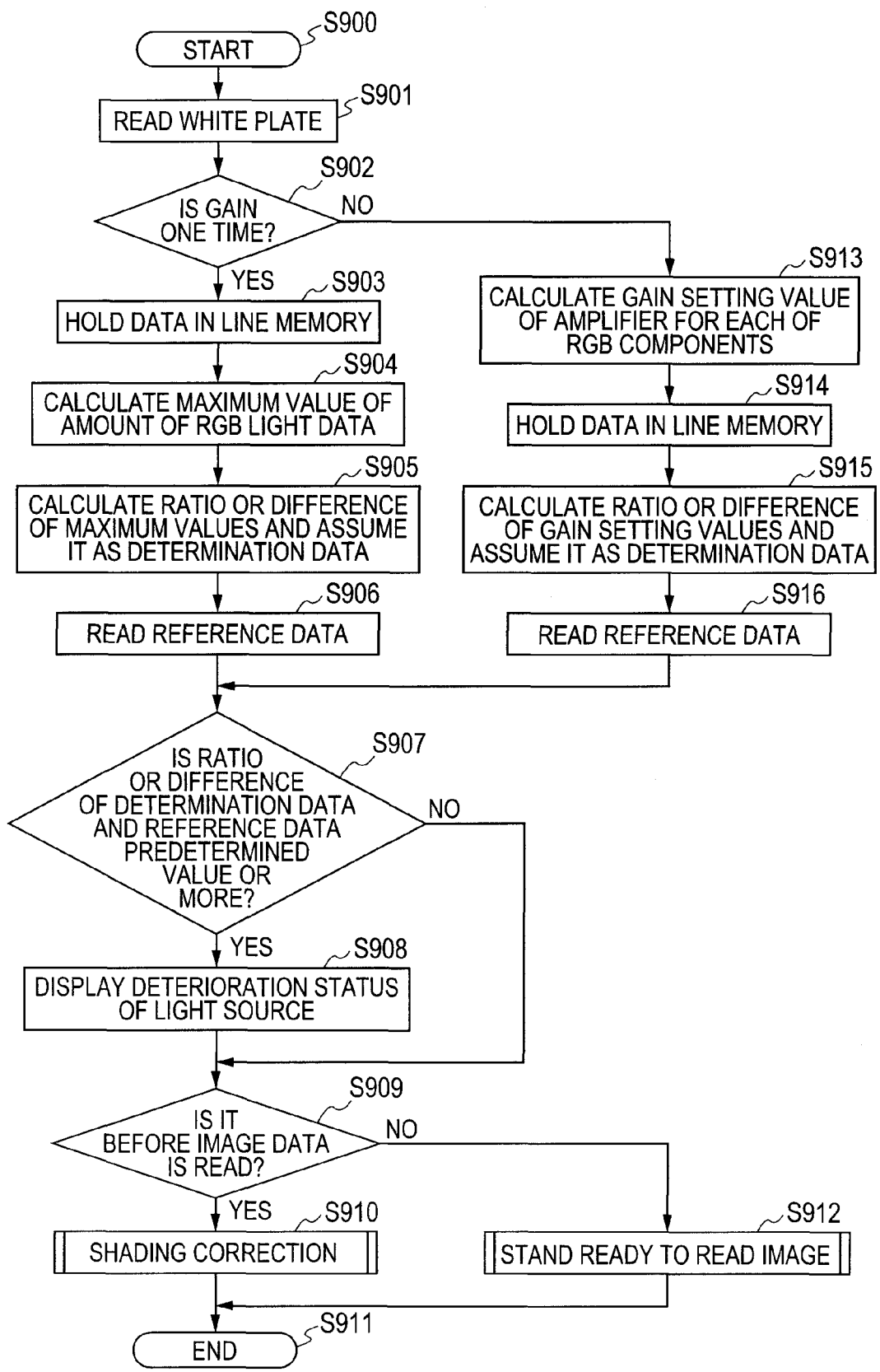
FIG. 6 is a flow chart illustrating determination of the hue balance according to the present invention.

FIG. 6 is a flow chart illustrating determination processing of the hue balance according to the present invention. A determination program is stored in the ROM 901, which is a storage medium readable by the CPU 900 as a computer. Note that, the determination program may be stored in the external computer instead of in the ROM 901, and the external computer may control the CPU 900 of the reader portion 200. The determination processing illustrated in FIG. 6 is executed at a time of power-on of the reader portion 200, and/or at a time of recovery after an electric power saving mode, and/or before the image on the original is read, and/or regularly after a lapse of a predetermined period of time.

When the determination processing has started at any one of the above-mentioned times (S900), the CPU 900 controls the optical system moving unit 302 to move the scanner unit 209 below the white plate 211, and reads the white plate 211 (S901). Note that, the CPU 900 may read a white reference original instead of the white plate 211. The CCD 208 includes the line sensor of red (R), the line sensor of green (G), and the line sensor of blue (B). FIG. 7 is a schematic graph illustrating read brightness values (light intensities) of red (R), green (G), and blue (B) obtained when the respective line sensors read the white plate 211 serving as the white reference. The CPU 900 determines whether to maintain the gain setting values (amplification factors) of analog amplifiers of the analog IC 1002 at "1", based on read brightness values RL, GL, and BL of R, G, and B (S902).

<Case of Gain Setting Value "1">

When the gain setting values are maintained at "1", brightness values (light intensity data) RL1, GL1, and BL1 output from the line sensors of R, G, and B are held in the line memories of R, G, and B of the image processing portion/line memory 1003, respectively (S903). The line memories of R, G, and B may each hold pieces of light intensity data received at every a predetermined number of sensor elements (S903). Alternatively, the line memories of R, G, and B may each hold mean value data among pieces of light intensity data output from a predetermined number of adjacent sensor elements (S903). The CPU 900 calculates maximum values RL1max, GL1max, and BL1max of the pieces of light intensity data RL1, GL1, and BL1 that are held in the line memories of R, G, and B, respectively (S904). The CPU 900 calculates ratios or differences between the maximum values of the pieces of RGB light intensity data, and assumes the obtained ratios or differences as pieces of determination data regarding the hue (S905). Specifically, as the ratios between the maximum values, the CPU 900 calculates pieces of determination data BL1max/RL1max, BL1max/GL1max, and GL1max/RL1max. Alternatively, as the differences between the maximum values, the CPU 900 calculates pieces of determination data BL1max-RL1max, BL1max-GL1max, and GL1max-RL1max. When the pieces of determination data are the ratios between the maximum values, the CPU 900 reads pieces of reference data (BL/RL)ref, (BL/GL)ref, and (GL/RL)ref from the ROM (storage unit) 901 or the RAM (storage unit) 902 (S906). When the pieces of determination data are the differences between the maximum values, the CPU 900 reads pieces of reference data (BL−RL)ref, (BL−GL)ref, and (GL−RL)ref from the ROM 901 or the RAM 902. Note that, the reference data is a ratio or difference between the maximum values of the pieces of RGB light intensity data which are calculated by the CPU 900 at an initial time of driving the light sources 203 and 210. The initial time of driving the light sources refers to a time when the light sources are driven for the first time after the light sources are mounted in the manufacturing of the image reading apparatus. Alternatively, the initial time of driving the light sources refers to a time when new light sources are driven for the first time after the old light sources are replaced with the new light sources due to the deterioration of the light sources. Further, the reference data may be set or changed manually. If the pieces of brightness value (light intensity) data at the initial time of driving the light sources do not exhibit a large difference among R, G, and B, a single piece of reference data that is common among R, G, and B may be stored in the ROM 901 or the RAM 902. Accordingly, reference data that is common among R, G, and B may be used. The CPU 900 determines whether or not a ratio or difference between the determination data and the reference data is a predetermined value RV1 or DV1 or more (S907). Specifically, the CPU 900 determines whether or not the following conditions are satisfied: (BL1max/RL1max)/(BL/RL)refRV1; (BL1max/GL1max)/(BL/GL)refRV1; and (GL1max/RL1max)/(GL/RL)refRV1. Alternatively, the CPU 900 determines whether or not the following conditions are satisfied: (BL1max−RL1max)−(BL−RL)refDV1; (BL1max−GL1max)−(BL−GL)refDV1; and (GL1max−RL1max)−(GL−RL)refDV1. When the ratio or difference between the determination data and the reference data is the predetermined value RV1 or more or DV1 or more, it is determined that the hue balance of the light sources is lost, and the CPU (determination unit) 900 controls the display portion 1004 to display the fact of the deterioration of the light sources 203 and 210 (S908). Accordingly, a user can be informed of the deterioration of the light sources. A plurality of predetermined values are provided for the purpose of the determination of the deterioration. Based on the plurality of predetermined values and comparison results (ratio or difference between the determination data and the reference data) obtained by the CPU 900, the CPU (determination unit) 900 can change contents of the information to be displayed on the display portion 1004 for the user (S908). Accordingly, the user can prepare for the replacement of the light sources. When the deterioration of the light sources is serious, the display portion 1004 can be used for alerting the user to prompt the replacement of the light sources. Accordingly, the user can replace the light sources.

The CPU 900 determines whether or not the determination program is executed before the image on the original is read (S909). The processing proceeds to 5909 also when the CPU 900 determines in 5907 that the ratio or difference between the determination data and the reference data is less than the predetermined value RV1 or DV1.

When it is determined in 5909 that the determination program is executed before the image on the original is read, the processing proceeds to a shading correction processing (S910), and then the determination program is terminated (S911). When the determination program is executed at a time other than before the image on the original is read, on the other hand, the processing proceeds to an image reading standby processing of standing ready for the next determination operation or an image reading operation (S912), and then the determination program is terminated (S911).

<Case of Changing Gain Setting Value>

When it is determined in S902 that the gain setting values of the analog amplifiers are not maintained at "1", on the other hand, the CPU 900 sets the gain setting values of the plurality of amplifiers, respectively, so that the brightness values (light intensity signals) amplified by the amplifiers fall within a predetermined range. Specifically, the CPU 900 calculates gain setting values (amplification factors) RG, GG, and BG of the analog amplifiers for the RGB components, respectively (S913). Then, the calculated gain setting values (amplification factors) RG, GG, and BG are used for amplifying the read brightness values, to obtain pieces of light intensity data RL2, GL2, and BL2. The pieces of amplified light intensity data received at every a predetermined number of sensor elements are held in the line memories of R, G, and B of the image processing portion/line memory 1003, respectively (S914). Alternatively, the line memories of R, G, and B of the image processing portion/line memory 1003 may each hold mean value data of pieces of amplified light intensity data output from a predetermined number of adjacent sensor elements (S914).

The CPU 900 calculates ratios or differences between the RGB gain setting values, and assumes the obtained ratios or differences as pieces of determination data regarding the hue (S915). Specifically, as the ratios between the gain setting values, the CPU 900 calculates pieces of determination data RG/BG, GG/BG, and RG/GG. Alternatively, as the differences between the gain setting values, the CPU 900 calculates pieces of determination data RG−BG, GG−BG, and RG−GG. When the pieces of determination data are the ratios between the gain setting values, the CPU 900 reads pieces of reference data (RG/BG)ref, (GG/BG)ref, and (RG/GG)ref from the ROM (storage unit) 901 or the RAM (storage unit) 902 (S916). When the pieces of determination data are the differences between the gain setting values, the CPU 900 reads pieces of reference data (RG−BG)ref, (GG−BG)ref, and (RG−GG)ref from the ROM 901 or the RAM 902. Note that, the reference data is a ratio or difference between the RGB gain setting values which are calculated by the CPU 900 at the initial time of driving the light sources 203 and 210. Further, the reference data may be set or changed manually. If the gain setting values at the initial time of driving the light sources do not exhibit a large difference among R, G, and B, a single piece of reference data that is common among R, G, and B may be stored in the ROM 901 or the RAM 902. Accordingly, reference data that is common among R, G, and B may be used. The CPU 900 determines whether or not a ratio or difference between the determination data and the reference data is a predetermined value RV2 or more or DV2 or more (S907). Specifically, the CPU 900 determines whether or not the following conditions are satisfied: (RG/BG)/(RG/BG)refRV2; (GG/BG)/(GG/BG)refRV2; and (RG/GG)/(RG/GG)refRV2. Alternatively, the CPU 900 determines whether or not the following conditions are satisfied: (RG−BG)−(RG−BG)refDV2; (GG−BG)−(GG−BG)refDV2; and (RG−GG)−(RG−GG)refDV2. When the ratio or difference between the determination data and the reference data is the predetermined value RV2 or more or DV2 or more, the determination unit of the CPU 900 operates. The CPU (determination unit) 900 controls the display portion 1004 to display the fact of the deterioration of the light sources 203 and 210 (S908). The subsequent steps are the same as those in the case of the gain setting value and description thereof is therefore omitted herein.

Modified Example of Embodiment

The technique of the above-mentioned embodiment is applicable to the xenon lamp and the white LED.

In the determination method for the hue balance according to the above-mentioned embodiment, the three pieces of determination data are calculated. However, in the white LED 530 used in the method of FIG. 4A, based on the tendency to the deterioration of the light sources illustrated in FIG. 5A, the light intensity of B hardly changes whereas the light intensity of G and R declines, along with the deterioration over time of the phosphors. Therefore, only a ratio or difference between G or R having a large change and B having a small change may be assumed as the determination data. Specifically, a single piece of determination data obtained based on only a ratio or difference between G and B may be used for determining the hue balance of the light sources. Alternatively, a single piece of determination data obtained based on only a ratio or difference between R and B may be used for determining the hue balance of the light sources. Still alternatively, two pieces of determination data obtained based on the ratio or difference between G and B and the ratio or difference between R and B may be used for determining the hue balance of the light sources. By reducing the number of pieces of determination data as described above, loads of the calculation imposed on the CPU can be reduced. Further, the number of pieces of data to be stored and saved can be reduced.

For example, in the case of the gain setting value "1", the read brightness values (light intensity data) BL1 and RL1 of the R line sensor and the B line sensor are held. Only the ratio (BL1max/RL1max) or the difference (BL1max−RL1max) between the maximum value BL1max of the read brightness value BL1 and the maximum value RL1max of the read brightness value RL1 is assumed as the determination data. As the reference data, only the reference data (BL/RL)ref or (BL−RL)ref at the initial time of driving the white LED 530 needs to be stored in the RAM or the ROM. Then, when the ratio or difference between the determination data and the reference data is the predetermined value or more, it may be determined that the white LED 530 has been deteriorated.

In the case of changing the gain setting values, on the other hand, only the ratio (RG/BG) or the difference (RG−BG) between the gain setting values of R and B is assumed as the determination data. As the reference data, only the reference data (RG/BG)ref or (RG−BG)ref at the initial time of driving the white LED needs to be stored in the RAM or the ROM. Then, when the ratio or difference between the determination data and the reference data is the predetermined value or more, it may be determined that the white LED 530 has been deteriorated.

Similarly, also in the case of the xenon lamp, as illustrated in FIG. 5B, such a fact is known that the tendency to the deterioration over time of the xenon lamp is different from that of the white LED and the chromaticity is shifted so that both a chromaticity coordinate X and a chromaticity coordinate Y increase. In this case, the hue becomes more yellowish. This fact shows that the blue frequency component is remarkably different between a new lamp and a deteriorated lamp. In this case, focusing on B, the determination may be made by using only the ratio or difference between B and R or the ratio or difference between B and G. In this case, the pieces of data do not need to be stored for the three colors of R, G, and B, but for only two colors of B and R or G. Accordingly, the capacity of the RAM or the ROM can be reduced. Further, the loads of the processing imposed on the CPU can be reduced.

In the above-mentioned embodiment, the display portion is used for displaying the fact that the hue balance of the light sources is lost. Further, the display portion is used for displaying a prompt to replace the light sources. Alternatively, when it is determined that the light sources have been deteriorated, a computer that monitors at a remote location the image forming apparatus including the image reading apparatus may be notified that the light sources have been deteriorated, via a local area network (LAN) or a public line. With this structure, the computer can be informed of the deterioration of the light sources with high efficiency. Then, the computer can take such measures as to notice the user of the abnormality of the light sources or prompt the user to replace the light sources before the hue balance of the light sources is lost because of the deterioration over time.

According to this embodiment, the deterioration over time of the light sources of the image reading apparatus can be detected with the simple structure. According to the image reading apparatus of this embodiment, the user can be prompted to replace the light sources.

According to this embodiment, the user can be noticed or alerted that the light sources have been deteriorated, at the time of power-on of the image reading apparatus, and/or at the time of recovery after the electric power saving mode, and/or before the image on the original is read, and/or regularly after the lapse of the predetermined period of time.

Further, according to this embodiment, the hue imbalance of the reproduced image due to the abnormality of the light sources can be prevented.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-247634, filed Oct. 28, 2009, which is hereby incorporated by reference herein in its entirety.

What is claimed is:

1. An image reading apparatus, which reads an image on an original, the image reading apparatus comprising:
   a light source extending along a main scanning direction to illuminate the original;
   a plurality of line sensors configured to receive light reflected from the original and to output light intensity signals;
   a storage unit configured to store reference data; and
   a determination unit configured to obtain determination data regarding hue based on a light intensity signal output from one of the plurality of line sensors that receive light reflected from a reflective reference member illuminated by the light source and a light intensity signal output from another of the plurality of line sensors that receive light reflected from the reflective reference member illuminated by the light source and to determine a hue balance of the light source based on the determination data and the reference data stored in the storage unit.

2. An image reading apparatus according to claim 1, wherein the determination data comprises a ratio between a maximum value of the light intensity signal of the reflective reference member, which is output from the one of the plurality of line sensors, and a maximum value of the light intensity signal of the reflective reference member, which is output from the another of the plurality of line sensors.

3. An image reading apparatus according to claim 1, wherein the determination data comprises a difference between a maximum value of the light intensity signal of the reflective reference member, which is output from the one of the plurality of line sensors, and a maximum value of the light intensity signal of the reflective reference member, which is output from the another of the plurality of line sensors.

4. An image reading apparatus according to claim 1, wherein the plurality of line sensors comprise:
   a line sensor provided with a red color filter;
   a line sensor provided with a green color filter; and
   a line sensor provided with a blue color filter,
   wherein the one of the plurality of line sensors comprises the line sensor provided with the blue color filter, and
   wherein the another of the plurality of line sensors comprises the line sensor provided with the red color filter or the line sensor provided with the green color filter.

5. An image reading apparatus according to claim 1, wherein each of the light intensity signals output from the plurality of line sensors is a light intensity signal output from every a predetermined number of a plurality of sensor elements of each of the plurality of line sensors, or a mean value among light intensity signals output from a predetermined number of adjacent sensor elements of each of the plurality of line sensors.

6. An image reading apparatus according to claim 1, wherein the determination unit determines the hue balance of the light source at a time of power-on, and/or at a time of recovery after an electric power saving mode, and/or before the image on the original is read, and/or regularly after a lapse of a predetermined period of time.

7. An image reading apparatus according to claim 1, wherein, when a ratio or a difference between the determination data and the reference data is a predetermined value or more, the determination unit determines that the light source has been deteriorated.

8. An image reading apparatus according to claim 1, wherein the light source comprises a rare gas phosphor lamp, or an illumination unit having a plurality of LEDs arrayed along the main scanning direction.

9. An image reading apparatus according to claim 1, further comprising a display unit configured to display a status of the light source based on a result of the determination performed by the determination unit.

10. An image reading apparatus according to claim 9, wherein the display unit displays a prompt to replace the light source.

11. An image reading apparatus, which reads an image on an original, the image reading apparatus comprising:
   a light source extending along a main scanning direction to illuminate the original;
   a plurality of line sensors configured to receive light reflected from the original and to output light intensity signals;
   a plurality of amplifiers configured to respectively amplify the light intensity signals output from the plurality of line sensors;
   a storage unit configured to store reference data; and
   a determination unit configured to obtain determination data regarding hue based on a gain setting value of one of the plurality of amplifiers that amplify light intensity signals output from the plurality of line sensors that receive light reflected from a reflective reference member illuminated by the light source and a gain setting value of another of the plurality of amplifiers that amplify light intensity signals output from the plurality of line sensors that receive light reflected from the reflective reference member illuminated by the light source and to determine a hue balance of the light source based on the determination data and the reference data stored in the storage unit.

12. An image reading apparatus according to claim 11, wherein the determination data comprises a ratio between the gain setting value of the one of the plurality of amplifiers and the gain setting value of the another of the plurality of amplifiers.

13. An image reading apparatus according to claim 11, wherein the determination data comprises a difference between the gain setting value of the one of the plurality of amplifiers and the gain setting value of the another of the plurality of amplifiers.

14. An image reading apparatus according to claim 11, wherein the plurality of line sensors comprise:
   a line sensor provided with a red color filter;
   a line sensor provided with a green color filter; and
   a line sensor provided with a blue color filter,
   wherein the one of the plurality of amplifiers comprises an amplifier used for the line sensor provided with the blue color filter, and
   wherein the another of the plurality of amplifiers comprises an amplifier used for the line sensor provided with the red color filter.

15. An image reading apparatus according to claim 11, wherein each of the light intensity signals output from the plurality of line sensors is a light intensity signal output from every a predetermined number of a plurality of sensor elements of each of the plurality of line sensors, or a mean value among light intensity signals output from a predetermined number of adjacent sensor elements of each of the plurality of line sensors.

16. An image reading apparatus according to claim 11, wherein the determination unit determines the hue balance of the light source at a time of power-on, and/or at a time of recovery after an electric power saving mode, and/or before the image on the original is read, and/or regularly after a lapse of a predetermined period of time.

17. An image reading apparatus according to claim 11, wherein, when a ratio or a difference between the determination data and the reference data is a predetermined value or more, the determination unit determines that the light source has been deteriorated.

18. An image reading apparatus according to claim 11, wherein the light source comprises a rare gas phosphor lamp, or an illumination unit having a plurality of LEDs arrayed along the main scanning direction.

19. An image reading apparatus according to claim 11, further comprising a display unit configured to display a status of the light source based on a result of the determination performed by the determination unit.

20. An image reading apparatus according to claim 19, wherein the display unit displays a prompt to replace the light source.

* * * * *